Figure 1:
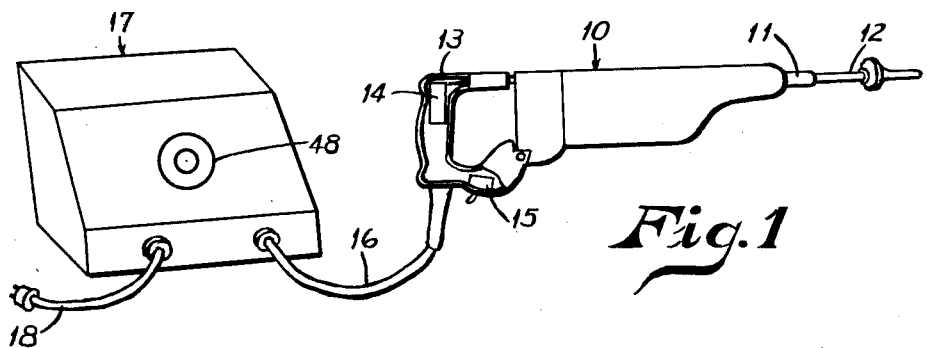

Feb. 24, 1953 W. H. McELVENNY 2,629,852
ELECTRIC CONTROL FOR MOTORS
Filed April 21, 1951

INVENTOR.
William H. McElvenny
BY
Charles P. Vojtech
atty.

Patented Feb. 24, 1953

2,629,852

UNITED STATES PATENT OFFICE 2,629,852

ELECTRIC CONTROL FOR MOTORS

William H. McElvenny, Drexell Hill, Pa., assignor to Crane Packing Company, Chicago, Ill., a corporation of Illinois Application April 21, 1951, Serial No. 222,261

3 Claims. (Cl. 318—476)

1

This invention relates to an electric control for motors and particularly to a control which stops the motor when the load thereon reaches a predetermined value.

For purposes of illustration, this invention will be described with reference to its use in connection with a portable electric motor used to operate a tube expanding tool. It is understood, of course, that the tool used with the motor may vary and may comprise a screw driver, tap, grinding wheel, saw, etc.

In the tube expanding art there have been proposed various controls for the motors used therein. One such control comprises electronic devices which compare voltages developed by various elements of the control in such a manner that when the voltage compared reaches a predetermined value, the motor is shut off. In another form, the current drawn by the motor is measured and by suitable means operating in conjunction with the needle of the measuring device, the motor is shut off when the needle reaches a predetermined position. In yet another form the control is comprised of a simple overload relay.

In all of the forms heretofore proposed, various degrees of accuracy are attained. The least accurate is the relay, and the most accurate is the electronic device. When the controls are used for tube expanding, however, they are generally located on the floor of a boiler room, either on board ship or in a stationary power plant and are subjected to very rough treatment. Such controls, therefore, must be extremely rugged and insensitive to blows and external electrical disturbances in order to perform satisfactorily for long periods of time. The electronic device as well as the measuring device heretofore proposed have been found to be somewhat delicate for the environment in which they are used, to the extent that frequent adjustments or repairs, or both, are required in order to maintain uniform results.

The principal object of this invention is to provide a control for an electric motor or the like by which the motor is stopped when a predetermined load thereon is produced, said control being extremely rugged and yet sensitive enough to give consistent results.

Another object of this invention is to provide a control for an electric motor or the like wherein said control uses readily available electric components, all of which are extremely rugged and insensitive to external electric disturbances.

2

A more specific object of this invention is to provide a control for an electric motor or the like, said control incorporating a relay in the form of a current measuring device, said relay in turn operating a master relay which effects the cutting off of the current to the motor.

Figure 2:
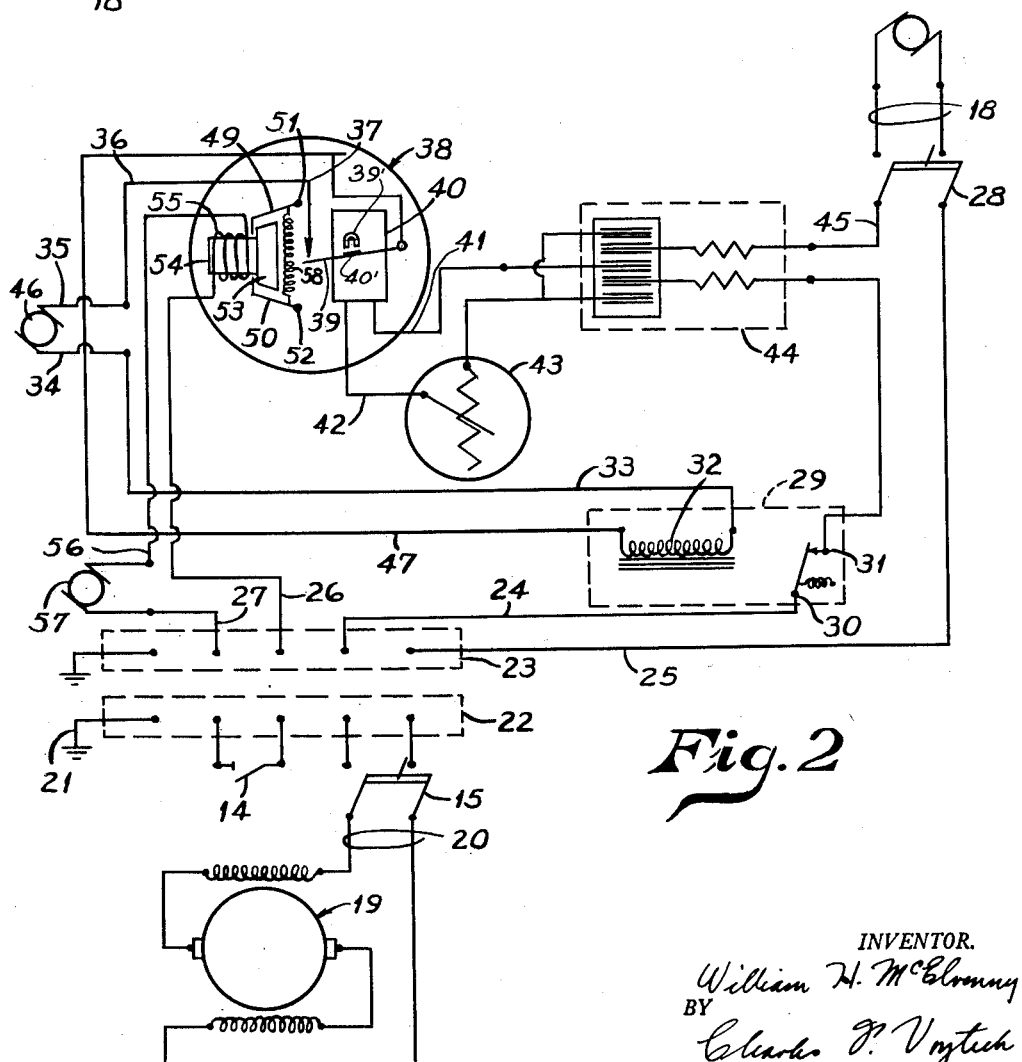

These and other objects of this invention will become apparent from the following detailed description when taken together with the accompanying drawings, in which Fig. 1 is a schematic diagram of a portable electric motor driven tool and a control for the motor; and Fig. 2 is a wiring diagram for the control and motor of Fig. 1.

Referring now to the drawings for a detailed description of the invention and particularly to Fig. 1, there is shown a portable electric motor driven tool or gun 10 having a spindle 11 which drives a tube expander 12. A handle 13 is provided by which the tool may be carried, said handle having incorporated therein a microswitch 14 which is operated by a forward pressure on handle 13, that is, a pressure in the general direction of expander 12. The microswitch 14 and the means for operating it are described in detail in a copending application of Newell Brackett, Serial No. 140,731, filed January 26, 1950, and hence will not be detailed here. A second switch 15 is likewise incorporated in the handle, said switch serving to turn the motor 10 on and off. Said motor switch 15 and microswitch 14 are connected through a cable 16 to the control designated in this figure generally by the reference character 17, said control in turn being connected through a cable 18 to a suitable source of electric energy (not shown) which may be a standard 110 volt line.

It is contemplated in the operation of the device shown in Fig. 1 that when it is desired to roll a series of tubes in a condenser or the like, the cable 18 is plugged into a suitable receptacle for connection with a source of electric energy and switch 15 is then turned to its "on" position to start motor 10 operating. Next, expander 12 is inserted into a tube and handle 13 is then pushed toward the expander to operate microswitch 14, whereupon the control 17 is connected into the circuit to shut the motor off when the tube operated upon by expander 12 has been rolled to a predetermined degree. The function of microswitch 14 is to prevent the control 17 from being operated during the initial current surge through the motor when said motor is turned on. This surge may exceed the current value for which the control is set and unless the control were disconnected from the gun during the initial surge, the gun would never be started.

Referring now to Fig. 2 for a description of the circuit, the electric motor is shown at 19 connected through a line 20 to switch 15, said switch being shown as a double pole single throw switch of any readily available design capable of handling the current used in the motor. Microswitch 14 is shown adjacent the schematic showing of switch 15 and a ground connection 16 is shown adjacent microswitch 14. Said switch 15 connects line 20 to a plug 22 which is adapted to be inserted into a receptacle 23 in the control 17. Said plug 22 is adapted to connect line 20 through the switch 15 to conductors 24 and 25, and microswitch 14 to conductors 26 and 27. Thus cable 16 is comprised of line 20, the wires leading to microswitch 14 and ground 21.

Conductor 25 is directly connected to a main switch 28, preferably located at some accessible point at the exterior of control 17, said main switch 28 connecting conductor 25 to one side of line 18. Conductor 24 is connected to a contact 30 of a normally operated relay 29 which controls the connection of said conductor 24 to the other lead in line 18 through switch 28. Said relay 29 therefor has a movable contact 30 and a fixed contact 31 so arranged that the contacts are normally closed and are open when relay 29 is energized.

The winding 32 of relay 29 is connected through conductor 33 to one side of a source of electric energy 34 which again may be the standard 110 volt line, the other side 35 of which being connected through a conductor 36 to a stationary contact 37 in a current sensitive device designated generally by the reference character 38. The movable contact 39 of said device 38 is in the form of a needle carried by a meter armature 40 which is in series, through conductors 41 and 42, with a variable resistance 43, a rectifier 44 with the other connector 45 of line 18 and fixed contact 31 of relay 29.

The needle 39 forms a part of the circuit including relay 29 and the source of electric energy 46. To this end the other side 47 of relay winding 32 is connected to a needle 39 so that when needle 39 makes contact with the stationary contact 37, a complete circuit is established from the source of electric energy 46 through relay winding 32 to energize said relay. Since relay 29 is a normally closed relay, the energization of its winding 32 will cause the contacts 30 and 31 to open, thereby opening the line to motor 19 and causing said motor to stop.

Since the armature 40 is in series with motor 19, the current passing through said armature will be a function of the current passing through the motor. Thus needle 39 will move from a position corresponding to a low current passing through motor 19 to a position corresponding to a high value of current passing through said motor, depending upon the load imposed upon the spindle 11 of said motor. The degree of movement of the needle 39 can be controlled by the variable resistance 43. Thus, with a high resistance setting of rate of resistance 43, a relatively high current is required through motor 19 to effect a predetermined movement of needle 39 and similarly a setting of resistance 43 corresponding to a low resistance would require a correspondingly low current through motor 19 to effect the same degree of movement of needle 39.

It is apparent, therefore, that by calibrating resistance 43 in suitable terms, such as degree of rolling, the control can be set to cut the motor out for a greater or lesser degree of rolling. Thus the only control for the device may comprise a dial 48 located on the exterior of the control mechanism shown in Fig. 1, the dial being connected to the movable element of variable resistance 43.

In order to provide a positive action for the control, that is, an action which shuts off motor 19 and maintains it in shut-off condition while the microswitch 14 is operative but the motor 19 is inoperative, contact 37 and needle 39 are provided with a magnet and a permanent magnetic substance, respectively, so that when contact is established between them, they will be held in contacted position by the magnetic attraction between them even though the motivating current in armature 40 has disappeared. Obviously, this magnetic attraction must be controllable so that when it is desired to render the control operative again, said contacts will be separated.

The control for the contacts is comprised of a pair of pivoted bell cranks 49 and 50, the ends 51 and 52 respectively of which are adapted to strike needle 39 and move it away from contact 37. The bell cranks 49 and 50 are operated by an abutment 53 carried by an armature 49 which in turn is operated by a solenoid 55. Said solenoid 55 is in series with microswitch 14 through conductors 26 and 56, and with a source of electric energy 57. Thus, whenever microswitch 14 is operated, the source of energy 57 is connected in series with solenoid 55 to energize said solenoid and thereby cause armature 54 to move to the left as viewed in Fig. 2, which in turn causes the abutment 53 to strike the bell cranks 49 and 50 and rotate them clockwise and counterclockwise respectively, as viewed in Fig. 2, to separate needle 39 from contact 37. Since microswitch 14 is operated each time handle 13 is moved to the right as viewed in Fig. 1, that is, whenever it is desired to roll a tube, said needle will be liberated from contact 37 whenever a rolling operation is commenced and needle 39 will be free to follow the variations of current in the motor 19 as required.

Said microswitch 14 as shown in Fig. 2 is normally closed, and when operated by the movement of handle 13, as aforesaid, it is opened, thereby deenergizing solenoid 55 and releasing bell cranks 49 and 50. The release of said bell cranks 49 and 50 may be accomplished through a spring 58 which is in compression between said cranks so as to tend to separate the ends 51 and 52 thereof.

Inasmuch as microswitch 14 is closed when pressure on handle 13 is toward the left as viewed in Fig. 1, that is, whenever it is desired to withdraw the expanding tool 12 from a rolled tube, its effect on the needle 39 to free said needle always occurs at a time when the control has already performed its function and is not yet required to repeat its cycle. Since needle 39 is held in its released position during the withdrawal of the tool, the momentary surge of current through motor 19 when the latter is started up does not affect the control.

The current responsive device 38 may be of the type which is commercially available under the trade name Weston "Sensitrol" and manufactured by the Weston Instrument Company in Newark, New Jersey. The various sources of electric energy shown in Fig. 2 may, of course, be combined into a single source if desired, and for the sake of universal availability may be the ordinary 110 volt line with three branches, one connected to line 18, the second connected to conductors 34 and 35, and the third connected to conductors 56 and 57.

Although the operation of the device is apparent from the foregoing description, a resume of the operation is as follows:

Cable 16 of gun 10 is plugged into receptacle 23 on control 17 and line 18 is plugged into a suitable 110 volt receptacle. Control dial 48 is set to the value of the "cut off" desired in motor 10, that is, for the desired value of tube rolling, and switch 28 is turned to its "on" position. This connects the 110 volt line to the control mechanism and also connects the 110 volt line to conductors 34 and 35 and 56 and 57. Next, switch 15 is turned to its "on" position to start the motor and the expander tool 12 is inserted into a tube to be rolled. Pressure is then exerted upon handle 13 in the direction of the expanding tool 12 which automatically operates microswitch 14 to open the contacts thereof. This releases needle 39 through the deenergization of solenoid 55 and the rolling then commences and continues while the tube is expanded into its tube. As the expansion continues, the resistance to the turning of expander tube 12 increases, particularly at the point where metal-to-metal contact between the tube and sheet begins, thereby causing the current passing through motor 19 to increase. This increase in current is reflected in a movement of needle 39 toward fixed contact 37. When contact is established between needle 39 and fixed contact 37, relay 32 becomes energized, which in turn breaks contacts 30 and 31 thereby opening the line to motor 19 and causing said motor to stop.

To withdraw tool 12 from the rolled tube, handle 13 is pulled to the left as viewed in Fig. 1 which automatically reconnects microswitch 14, thereby energizing solenoid 55 and breaking contact between needle 39 and contact 37. This deenergizes relay 32, thereby reestablishing a circuit through motor 19 to start the motor. It is contemplated that a reversing mechanism is supplied in the drive between motor 10 and spindle 11 so that the reversing mechanism is automatically rendered operative whenever handle 13 is pulled to the left, that is, whenever expander tool 12 is withdrawn from a tube. Motor 10 remains in operation until the next tube is to be rolled, whereupon the cycle is repeated.

It is understood that the foregoing description is merely illustrative of a preferred embodiment of the invention and that the scope of the invention therefore is not to be limited thereto, but is to be determined by the appended claims.

What is claimed is:

1. A control for an electrical device such as the electric motor of a portable electric tool or the like, said control having a relay coil and a switch operated by the relay coil, said switch being connected to the motor and thus controlling the operation of the tool, a source of electrical energy, a meter connected in series with the source of energy and the switch, said meter having a movable armature, a switch operable by the armature when the current through the latter reaches a predetermined value, said armature operated switch being in series with the relay coil and the source of electrical energy to control the actuation of the relay and the electrical tool controlled thereby, releasable holding means acting upon the armature operated switch to hold the latter in operated condition after the circuit through the motor is broken, and means controlled by the operation of the tool and acting upon the armature operated switch to release said holding means.

2. A control for an electric device as described in claim 1 in which the releasable holding means comprises an electromagnetically operated arm adapted to contact the armature operated switch and move it to inoperative position, and a switch on the tool and operated by a necessary movement of the tool to control the operation of the electromagnetically operated arm.

3. A control for an electrically operated tube rolling device, said device having an electric motor and a pivoted handle for the motor, said control having a relay coil and a switch operated by the relay coil, said switch being connected to the tool and controlling the operation of the tool, a source of electrical energy, a meter connected in series with the source of energy and the relay switch, said meter having a movable armature, a switch operable by the armature when the current reaches a predetermined value, said switch being in series with the relay coil and the source of electrical energy to control the actuation of the relay and the electrical tool controlled thereby, magnetic means on the switch operable to hold the switch in operated condition after the circuit through the armature is broken, electromagnetic means operable to release the switch and a switch on the tube rolling device and operated by the pivoted handle when the device is inserted into a tube to control the electromagnetic means to release the switch and armature.

WILLIAM H. McELVENNY.

REFERENCES CITED

The following references are of record in the file of this patent:

UNITED STATES PATENTS

| Number | Name | Date |
|---|---|---|
| 1,160,771 | Schalkau | Nov. 16, 1915 |
| 2,521,479 | Rauttner | Sept. 5, 1950 |
| 2,535,782 | Carlson | Dec. 26, 1950 |